(12) United States Patent
Onodera et al.

(10) Patent No.: US 10,088,815 B2
(45) Date of Patent: Oct. 2, 2018

(54) WIRE ELECTRIC DISCHARGE MACHINE PERFORMING MACHINING WHILE ADJUSTING MACHINING CONDITION

(71) Applicant: FANUC Corporation, Yamanashi (JP)

(72) Inventors: Mitsuharu Onodera, Yamanashi (JP); Kaoru Hiraga, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 221 days.

(21) Appl. No.: 15/248,032

(22) Filed: Aug. 26, 2016

(65) Prior Publication Data

US 2017/0060105 A1    Mar. 2, 2017

(30) Foreign Application Priority Data

Aug. 27, 2015 (JP) ................... 2015-168104

(51) Int. Cl.
*G05B 13/02* (2006.01)
*B23H 7/20* (2006.01)
(Continued)

(52) U.S. Cl.
CPC ........... *G05B 13/0265* (2013.01); *B23H 7/20* (2013.01); *G05B 19/0426* (2013.01);
(Continued)

(58) Field of Classification Search
None
See application file for complete search history.

(56) References Cited

U.S. PATENT DOCUMENTS

| 5,091,620 A | 2/1992 | Mohri et al. |
| 5,742,018 A | 4/1998 | Akemura |
| 2007/0051701 A1 | 3/2007 | Ogata et al. |

FOREIGN PATENT DOCUMENTS

| JP | 62-74527 A | 4/1987 |
| JP | 63-99135 A | 4/1988 |

(Continued)

OTHER PUBLICATIONS

Ho, K. H., et al. "State of the art in wire electrical discharge machining (WEDM)." International Journal of Machine Tools and Manufacture 44.12-13 (2004): 1247-1259.*

(Continued)

*Primary Examiner* — Kakali Chaki
*Assistant Examiner* — Daniel Pellett
(74) *Attorney, Agent, or Firm* — Hauptman Ham, LLP

(57) ABSTRACT

A wire electric discharge machine according to the present invention includes a machine learning device which performs machine learning for adjustment of a machining condition of the wire electric discharge machine, the machine learning device includes a state observation unit which acquires data related to a machining state of a workpiece, a reward calculation unit which calculates a reward based on data related to a machining state, a machining condition adjustment learning unit which determines an adjustment amount of a machining condition based on a machine learning result and data related to a machining state, and a machining condition adjustment unit which adjusts a machining condition based on the determined adjustment amount of a machining condition, and the machining condition adjustment learning unit performs machine learning for adjustment of a machining condition based on the determined adjustment amount of a machining condition, data related to a machining state and acquired by (Continued)

the state observation unit, and a reward which is calculated by the reward calculation unit.

8 Claims, 5 Drawing Sheets

(51) Int. Cl.
  *G06N 99/00* (2010.01)
  *G05B 19/042* (2006.01)
  *B23H 7/02* (2006.01)

(52) U.S. Cl.
  CPC ............. *G06N 99/005* (2013.01); *B23H 7/02* (2013.01); *G05B 2219/32334* (2013.01); *G05B 2219/36289* (2013.01)

(56) References Cited

FOREIGN PATENT DOCUMENTS

| | | |
|---|---|---|
| JP | 3-190625 A | 8/1991 |
| JP | 5-57530 A | 3/1993 |
| JP | H0521690 B2 | 3/1993 |
| JP | 7-116927 A | 5/1995 |

OTHER PUBLICATIONS

Kao, Chen-Chun, Albert J. Shih, and Scott F. Miller. "Fuzzy logic control of microhole electrical discharge machining." Journal of Manufacturing Science and Engineering 130.6 (2008): 064502.*

Sadeghi, Mohammad, et al. "Optimization of cutting conditions in WEDM process using regression modelling and Tabu-search algorithm." Proceedings of the Institution of Mechanical Engineers, Part B: Journal of Engineering Manufacture 225.10 (2011): 1825-1834.*

Tsai, Kuo-Ming, and Pei-Jen Wang. "Comparisons of neural network models on material removal rate in electrical discharge machining." Journal of Materials Processing Technology 117.1-2 (2001): 111-124.*

Tzeng, C. J., et al. "Optimization of wire electrical discharge machining of pure tungsten using neural network and response surface methodology." Proceedings of the Institution of Mechanical Engineers, Part B: Journal of Engineering Manufacture 225.6 (2011): 841-852.*

Carlos Henrique et al., "A Tutorial on Reinforcement Learning Techniques ", Jan. 1, 1999, pp. 18-21, Division of Computer Science, Department of Theory of Computation, Technological Institute of Aeronautics, São José dos Campos, Brazil.

Saha Probir et al., "Multi-objective optimization in wire-electro-discharge machining of TiC reinforced composite through Neuro-Genetic technique", Applied Soft Computing, Dec. 5, 2012, pp. 2065-2074, vol. 13, No. 4, Elsevier, Amsterdam, NL.

Caydas U et al., "An adaptive neuro-fuzzy inference system (ANFIS) model for wire-EDM", Expert Systems with Applications, Apr. 1, 2009, pp. 6135-6139, vol. 36, No. 3, Oxford GB.

Extend European Search Report in EP Application No. 16184709.0, dated Jan. 4, 2017.

Office Action in JP Application No. 2015-168104, dated Oct. 18, 2016.

* cited by examiner

EVEN THOUGH CIRCULAR HOLES TO HAVE SAME HOLE DIAMETERS ARE MACHINED, SIZES OF MACHINED CIRCULAR HOLES ARE DIFFERENT FROM EACH OTHER DUE TO DIFFERENCE IN MACHINING ENERGIES

FIG. 2A
BEFORE MACHINE LEARNING
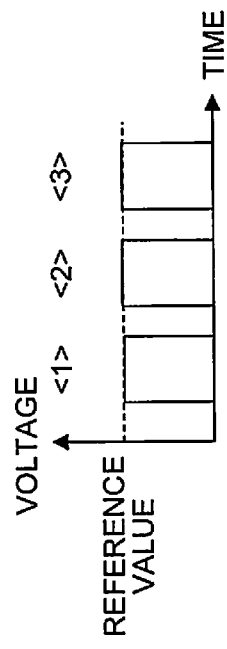
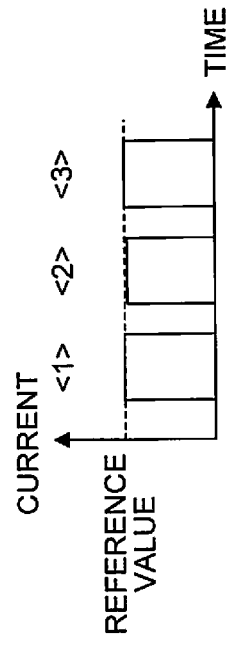
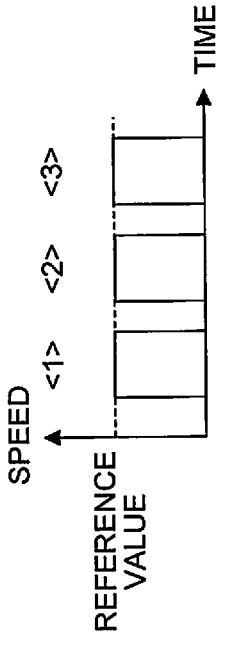
FIG. 2B
AFTER MACHINE LEARNING
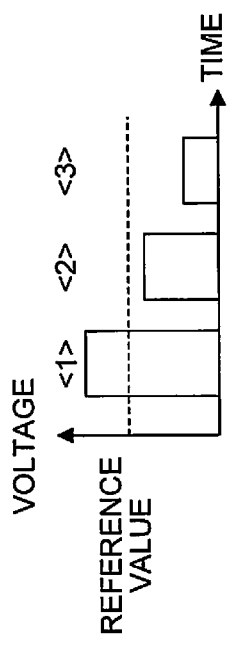
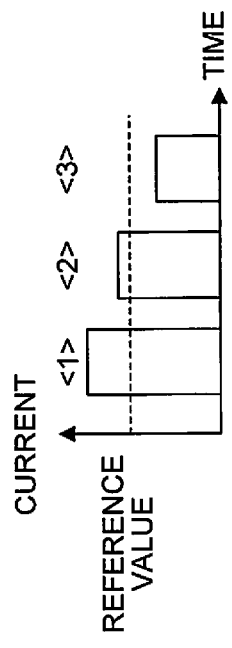
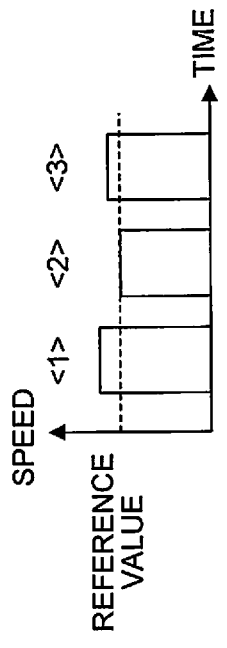

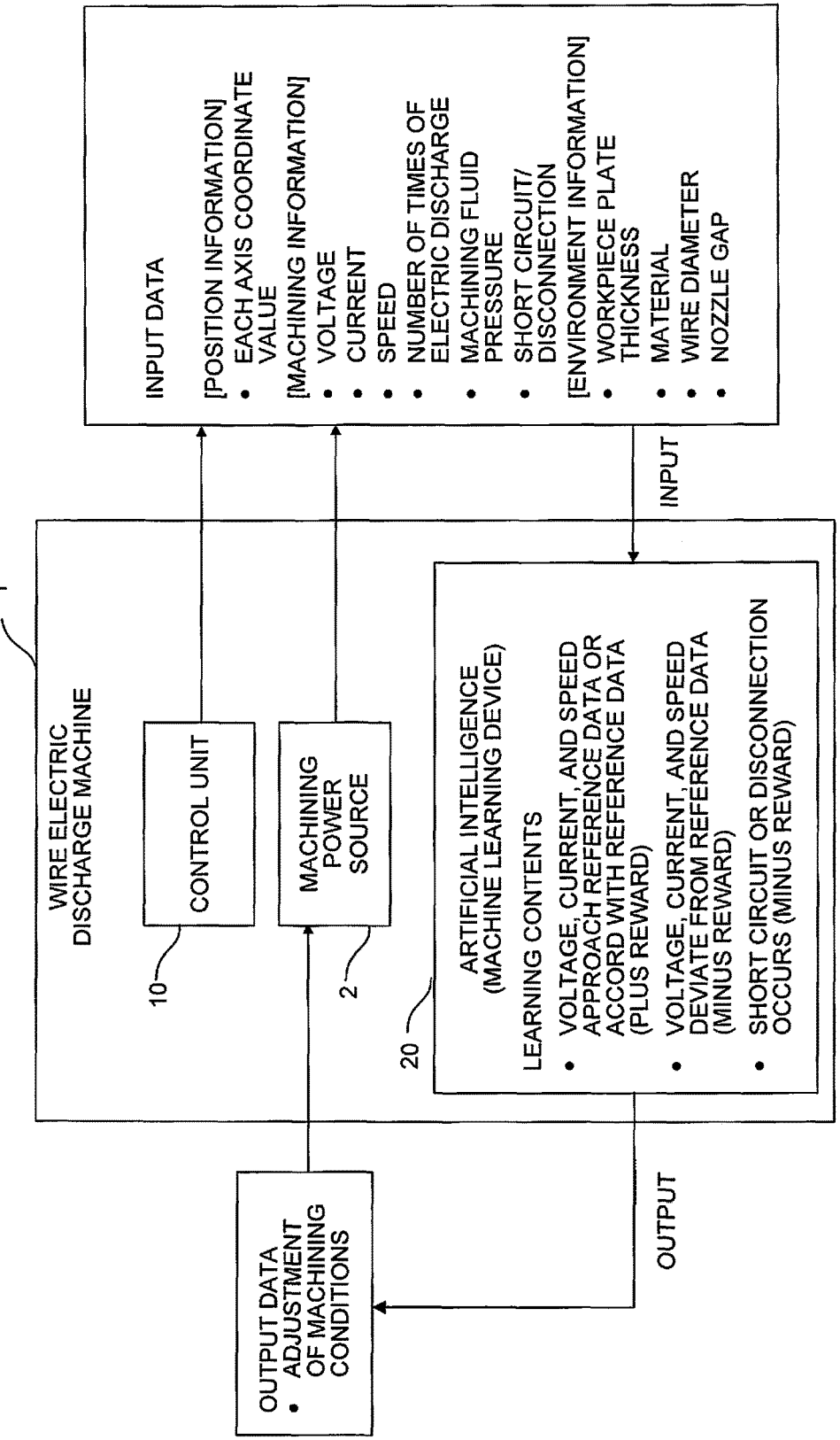

WIRE ELECTRIC DISCHARGE MACHINE PERFORMING MACHINING WHILE ADJUSTING MACHINING CONDITION

RELATED APPLICATIONS

The present application claims priority to Japanese Patent Application Number 2015-168104, filed Aug. 27, 2015, the disclosure of which is hereby incorporated by reference herein in its entirety.

BACKGROUND OF THE INVENTION

1. Field of the Invention

The present invention relates to a wire electric discharge machine, and especially relates to a wire electric discharge machine which is capable of adjusting machining conditions in accordance with a machining state in machining of a workpiece.

2. Description of the Related Art

In machining by a wire electric discharge machine, machining is performed by using machining conditions prepared in accordance with a workpiece and a wire diameter (Japanese Laid-Open Public Disclosure Examined Patent Application Publication No. 05-021690, for example). In these machining conditions, obtained machining speed and machining accuracy are commonly determined as theoretical values. However, determined machining speed and machining accuracy are not always obtained in practice due to a position on a table on which a workpiece is placed, secular change of a machine, machine difference, and the like. It is conceivable that this problem occurs due to difference in machining energies caused by difference in electrical resistances. Thus, it is conceivable that this problem occurs because a voltage, a current, and a speed (reference value data) at time of acquisition of machining conditions are not reproduced due to the difference in machining energies.

In order to deal with such problem, an operator has performed dimension confirmation of a processed product and has performed remachining by performing additional machining or adjusting machining conditions and finishing margins in the prior art.

However, experience is required to obtain a skill of adjustment of machining conditions and finishing margins and thus, there has been a problem in which it takes time to adjust machining conditions and finishing margins depending on a skill of an operator. Further, there is an assumption that additional machining and remachining are performed in the above-mentioned method. Thus, there has been a problem in which these additional operations take time and labor.

SUMMARY OF THE INVENTION

An object of the present invention is to provide a wire electric discharge machine which is capable of automatically adjusting machining conditions in accordance with a machining state in machining of a workpiece.

In the present invention, a wire electric discharge machine which performs machine learning based on environment information, position information, and machining information and adjusts various types of machining conditions so that machining data is accorded with reference value data.

A wire electric discharge machine according to the present invention controls a machining power source and a machining fluid in accordance with a machining condition set by a machining condition setting unit, applies a voltage between a wire-type electrode stretched between upper and lower nozzles, and a workpiece so as to generate electric discharge, and relatively moves the wire-type electrode and the workpiece so as to machine the workpiece. The wire electric discharge machine includes an environment information storage unit which stores environment information representing an environment related to the machining, and a machining condition adjustment device which performs machine learning of an adjustment object parameter of the machining condition and an adjustment amount of the adjustment object parameter, in which the machining condition adjustment device includes a state observation unit which acquires state data, which is information representing a machining state in the machining, a reward condition storage unit which stores a reward condition, a reward calculation unit which calculates a reward based on the state data and the reward condition, a machining condition adjustment learning unit which performs machine learning the machining condition adjustment, and a machining condition adjustment unit which determines an object parameter of the machining condition adjustment and an adjustment amount thereof as an adjustment action based on a machine learning result of the machining condition adjustment, which is obtained by the machining condition adjustment learning unit, the state data, and the environment information and adjusts a machining condition set by the machining condition setting unit based on the adjustment action so as to output an adjusted machining condition, and the machining condition adjustment learning unit performs machine learning for the machining condition adjustment based on the adjustment action, the state data acquired by the state observation unit, after a machining action based on the adjusted machining condition which is outputted, and the reward calculated by the reward calculation unit.

The state data includes at least position information of the wire-type electrode with respect to the workpiece.

The state data includes at least one of a machining voltage, a machining current, a machining speed, a number of times of electric discharge, an amount of a machining fluid, machining fluid pressure, an occurrence of short circuit, and an occurrence of disconnection.

The reward condition storage unit stores reference value data of a machining voltage, a machining current, and a machining speed of a case where machining is performed under a machining condition set by the machining condition setting unit.

The state data includes at least a machining voltage, machining current, and a machining speed, and the reward calculation unit gives a plus reward in a case where a machining voltage, a machining current, and a machining speed which are included in the state data approach reference value data obtained based on a machining condition set by the machining condition setting unit.

The state data includes at least a machining voltage, a machining current, a machining speed, an occurrence of short circuit, and an occurrence of disconnection, and the reward calculation unit gives a minus reward in a case where a machining voltage, a machining current, and a machining speed which are included in the state data deviate from reference value data obtained based on a machining condition set by the machining condition setting unit or in a case where at least one event between short circuit and disconnection which are included in the state data occurs.

The wire electric discharge machine may be connected with at least one another wire electric discharge machine and mutually exchange or share a result of machine learning with another wire electric discharge machine.

A machining condition adjustment device according to the present invention performs machine learning for machining condition adjustment performed by a wire electric discharge machine which controls a machining power source and a machining fluid in accordance with a machining condition set by a machining condition setting unit, applies a voltage between a wire-type electrode stretched between upper and lower nozzles, and a workpiece so as to generate electric discharge, and relatively moves the wire-type electrode and the workpiece so as to machine the workpiece. The machining condition adjustment device includes a learning result storage unit which stores a learning result of the machining condition adjustment, a state observation unit which acquires state data, which is information representing a machining state in the machining, and a machining condition adjustment unit which determines an object parameter of the machining condition adjustment and an adjustment amount thereof or a value after adjustment of the object parameter based on a learning result stored in the learning result storage unit and the state data observed by the state observation unit so as to adjust a machining condition.

In the present invention, machining conditions are adjusted through machine learning so as to eliminate difference in machining energies. Accordingly, stability and reproducibility of machining are enhanced and requirement of additional machining and remachining is eliminated. Further, data of a plurality of wire electric discharge machines are shared and used in machine learning. Accordingly, machine learning by which a superior result can be obtained can be realized in each of the wire electric discharge machines.

BRIEF DESCRIPTION OF THE DRAWINGS

The above-described and other objects and features of the present invention will be apparent from the following description of an embodiment in reference to the accompanying drawings. Among these drawings:

FIG. 2A,2B illustrate adjustment of machining conditions by machine learning according to the present invention;

FIG. 4 is an image drawing on machine learning of a wire electric discharge machine according to an embodiment of the present invention;

DETAILED DESCRIPTION OF THE PREFERRED EMBODIMENT

An embodiment of the present invention will be described below with reference to the accompanying drawings.

In the present invention, a machine learning device serving as artificial intelligence is introduced into a wire electric discharge machine which machines a workpiece, so as to perform machine learning on adjustment of machining conditions such as a voltage value and applying time of an applied voltage, pause time, and a supply amount of a machining fluid with respect to a machining state of a workpiece in the wire electric discharge machine. Thus, machining conditions are suitably adjusted depending on the machining state. In the present invention, the machine learning device operates as a machining condition adjustment device.

As described above, a machining speed and machining accuracy obtained under set machining conditions vary in practice depending on a position on a table on which a workpiece is placed, secular change of a machine, machine difference, and the like in a wire electric discharge machine. For example, as illustrated in FIG. 1, even in the case where machining is tried to be performed so as to machine circular holes having the same hole diameters under the same machining conditions, there is the case where the sizes of the circular holes machined on a position of <1>, a position of <2>, and a position of <3> are different from each other because difference in machining energies is generated on respective positions.

Figure 1:
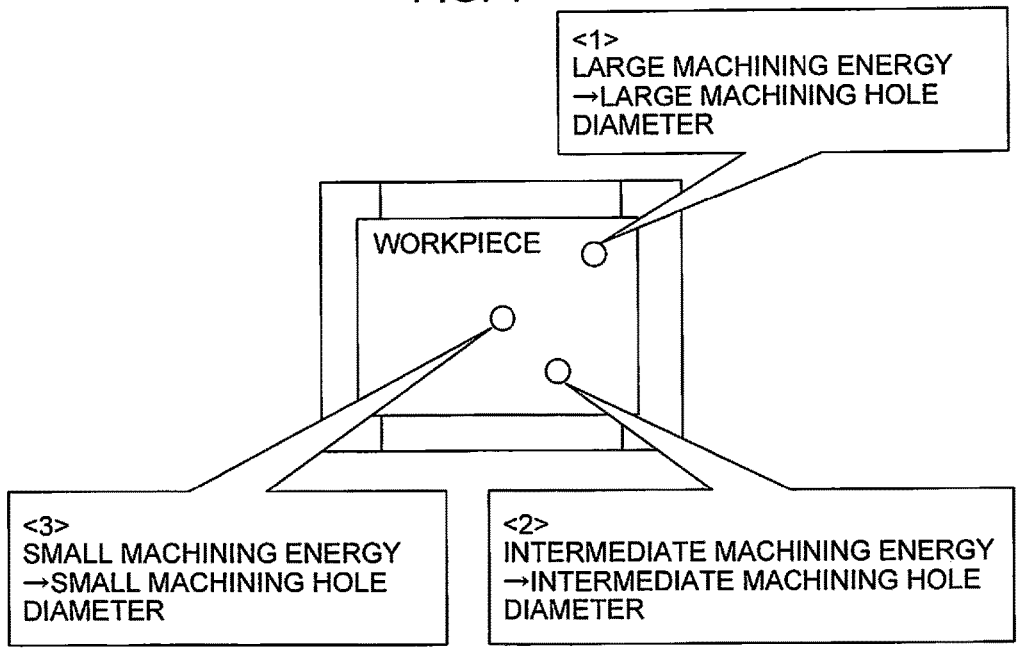
FIG. 1 illustrates difference in machining energies depending on machining positions in a wire electric discharge machine.

FIGS. 2A and 2B illustrate values of a voltage, a current, and a speed which are measured in machining of each of the holes of FIG. 1 as graphs. As illustrated in FIG. 2A, even in the case where machining is performed under the same machining conditions, difference is generated between values of a voltage, a current, and a speed which are determined under the set machining conditions (reference value data) and values of a voltage, a current, and a speed in machining on the position of <1>, the position of <2>, and the position of <3> in actual machining. As a result, the sizes of the circular holes machined on the respective positions are different from each other. Therefore, a machine learning device which performs machine learning on adjustment of machining conditions based on data representing a machining state (environment information, position information, and machining information) at time of machining of a workpiece in a wire electric discharge machine is introduced so as to automatically adjust machining conditions based on a result of the machine learning.

Machine learning introduced in the present invention will be simply described below.

1. Machine Learning

Commonly, machine learning is classified into various algorithms depending on objects and conditions such as supervised learning and unsupervised learning. In the present invention, learning of adjustment of machining conditions in a wire electric discharge machine which machines a workpiece is aimed and such algorithm of reinforcement learning is employed that the machine learning device automatically learns an action for target attainment only by supplying a reward, while considering that it is difficult to explicitly express what kind of action (adjustment of machining conditions) should be performed with respect to a machining state such as a voltage value, a current value, a machining speed, coordinate values of respective axes, and workpiece information which are outputted from the wire electric discharge machine.

Figure 3:
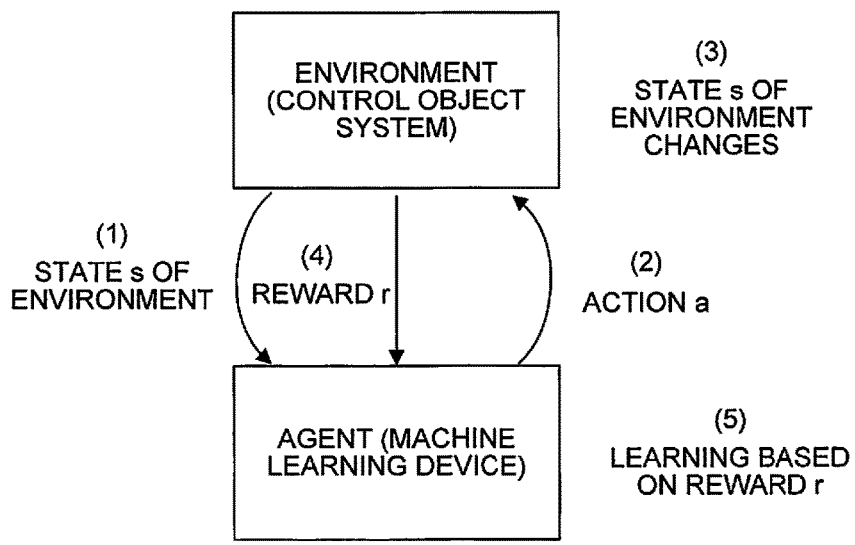
FIG. 3 illustrates a basic concept of a reinforcement learning algorithm.

FIG. 3 illustrates a basic concept of a reinforcement learning algorithm. In the reinforcement learning, agent learning and an action are advanced through exchange between an agent which is a main subject for learning (the machine learning device) and an environment which is a control object (a control object system). More specifically, such exchange is performed between an agent and an environment that (1) the agent observes a state $s_t$ of the environment at a certain time point, (2) the agent selects an action $a_t$ which can be performed by the agent, to execute the action $a_t$ based on an observation result and past learning, (3) the state $s_t$ of the environment shifts to a next state $s_{t+1}$ through the execution of the action $a_t$, (4) the agent receives a reward $r_{t+1}$ based on the shift of the state which is a result of the action $a_t$, and (5) the agent advances learning based on the state $s_t$, the action $a_t$, the reward $r_{t+1}$, and a result of past learning.

In the above-mentioned learning in (5), the agent acquires mapping of the observed state $s_t$, action $a_t$, and reward $r_{t+1}$ as information used as a reference for determination of an amount of a reward which will be able to be acquired. When the number of pieces of states which can be obtained at each time is denoted as m and the number of pieces of actions which can be obtained is denoted as n, for example, a two-dimensional array m×n in which the reward $r_{t+1}$ with respect to a set of the state $s_t$ and the action $a_t$ is stored is obtained by repeating an action.

Then, a value function (evaluation function) which represents qualities of current state and action based on the obtained mapping mentioned above is used and the value function (evaluation function) is updated during repetition of an action so as to learn an optimal action with respect to a state.

A state value function is a value function representing the quality of a certain state $s_t$. A state value function is expressed as a function in which a state is an argument. A state value function is updated based on a reward obtained with respect to an action in a certain state and a value of a future state which is obtained through shift by the action, for example, in learning during repetition of an action. An update formula of a state value function is defined in accordance with an algorithm of reinforcement learning. For example, a state value function is defined by Formula 1 below in TD learning which is one of reinforcement learning algorithms. Here, in Formula 1, α is called a learning coefficient, γ is called a discount rate, and α and γ are respectively defined in ranges of 0<α≤1 and 0<γ≤1.

$$V(s_t) \leftarrow V(s_t) + \alpha[r_{t+1} + \gamma V(s_{t+1}) - V(s_t)]$$ [Formula 1]

Further, an action value function is a value function representing the quality of an action $a_t$ in a certain state $s_t$. An action value function is expressed as a function in which a state and an action are arguments. An action value function is updated based on a reward obtained with respect to an action in a certain state and a value of an action in a future state which is obtained through shift by the action, for example, in learning during repetition of an action. An update formula of an action value function is defined in accordance with an algorithm of reinforcement learning. For example, an action value function is defined by Formula 2 below in Q learning which is one of typical reinforcement learning algorithms. Here, in Formula 2, α is called a learning coefficient, γ is called a discount rate, and α and γ are respectively defined in ranges of 0<α≤1 and 0<γ≤1.

$$Q(s_t, a_t) \leftarrow Q(s_t, a_t) + \alpha\left(r_{t+1} + \gamma \max_a Q(s_{t+1}, a) - Q(s_t, a_t)\right)$$ [Formula 2]

Here, examples of a method for storing a value function (evaluation function) as a learning result include not only a method using an approximation function and a method using an array but also a method using a supervised learning device such as a multi-value output SVM, by which values (evaluations) are outputted in response to input which is the state $s_t$ and the action $a_t$, and a neural network in the case where the state s takes many states, for example.

In the above-mentioned selection of an action in (2), an action $a_t$ by which rewards through the future ($r_{t+1}$ + $r_{t+2}$ + . . . ) become maximum in a current state $s_t$ (an action for shifting to a state of the highest value in the case where a state value function is used, an action in the state of the highest value in the case where an action value function is used) is selected by using a value function (evaluation function) produced based on past learning. Here, a random action may be selected with a fixed probability in the selection of an action in (2) so as to progress the learning during learning of the agent (ε greedy algorithm).

Thus, learning is advanced by repeating (1) to (5). Even in the case the agent is placed in a new environment after the agent finishes learning in a certain environment, the agent is capable of advancing learning to adapt itself to the new environment by performing additional learning. Accordingly, if the agent (machine learning device) is applied to determination of adjustment of machining conditions in machining of a workpiece in the wire electric discharge machine as the present invention, even in the case where a setting position of a workpiece is changed or the agent is applied to a new wire electric discharge machine, the agent can perform learning of adjustment of machining conditions in a short period of time by performing learning in the new environment in addition to past learning of adjustment of machining conditions.

Further, in the reinforcement learning, a system is constructed such that a plurality of agents are connected via a network or the like, and information of the state s, the action a, and the reward r is shared among the agents to be mutually used in learning of the agents. Thus, the agents perform distribution reinforcement learning, in which the agents perform learning while considering environments of other agents as well, and accordingly, the agents can efficiently perform learning. In the present invention as well, a plurality of agents (machine learning devices) controlling a plurality of environments (wire electric discharge machines) perform distribution machine learning in a state, in which the agents are connected with each other via a network or the like, so as to be able to efficiently perform learning of adjustment of machining conditions in machining of a workpiece in the wire electric discharge machines.

Here, though various methods such as Q learning, SARSA method, TD learning, and AC method are well known as algorithms of reinforcement learning, any reinforcement learning algorithm may be employed as a method applied to the present invention. Each of the above-mentioned reinforcement learning algorithms is well known, so that detailed description of each of the algorithms is omitted in the present specification.

A wire electric discharge machine, according to the present invention, to which a machine learning device is introduced will be described below based on a specific embodiment.

2. Embodiment

FIG. 4 illustrates an image on machine learning for adjustment of machining conditions in a wire electric discharge machine, according to an embodiment of the present invention, to which a machine learning device is introduced. In the present invention, a machine learning device operates as a machining condition adjustment device. Here, FIG. 4 illustrates only the configuration required for description of the machine learning in the wire electric discharge machine according to the present embodiment.

In the present embodiment, the following information is inputted to a machine learning device 20 as information for which the machine learning device 20 specifies an environment (the state $s_t$ described in <1. Machine learning>): environment information such as a plate thickness of a workpiece which is a machining object, a material of a workpiece, a wire diameter of a wire used for machining, and a nozzle gap representing a distance between upper and lower nozzles, which stretch a wire, and a workpiece; position information which is a coordinate value of each axis of the wire electric discharge machine; and machining information such as an actual voltage value, an actual current value, a machining speed, the number of times of electric discharge, a fluid pressure of a machining fluid, and an occurrence of short circuit/disconnection which are measured in machining of a workpiece. These values are data acquired from each unit of a wire electric discharge machine 1 and data acquired from a control unit 10 and a machining power source 2.

In the present embodiment, what the machine learning device 20 outputs with respect to an environment (the action at described in <1. Machine learning>), that is, output data is adjustment of machining conditions such as a voltage value and applying time of an interpolar voltage, pause time, and a supply amount of a machining fluid in machining by the wire electric discharge machine.

Further, in the present embodiment, as a reward given to the machine learning device 20 (the reward $r_t$ described in <1. Machine learning>), approach or deviation with respect to reference value data of a voltage value, a current value, and a machining speed value (plus reward, minus reward), an occurrence of short circuit/disconnection (minus reward), and the like are employed.

As for the reference value data of a voltage value, a current value, and a machining speed value, reference value data of theoretical voltage value, current value, and machining speed value is preliminarily determined based on machining conditions which are set before start of machining. Here, data used for determination of a reward may be appropriately selected to be set by an operator.

Further, in the present embodiment, the machine learning device 20 performs machine learning based on the above-mentioned input data, output data, and reward. In the machine learning, the state $s_t$ is defined by a combination of input data at certain time t, adjustment of machining conditions performed with respect to the defined state $s_t$ is set as the action $a_t$, a value obtained through evaluation calculation based on input data which is newly obtained as a result of the adjustment of machining conditions as the action $a_t$ is set as the reward $r_{t+1}$, and these are applied to an update formula of a value function (evaluation function) corresponding to an algorithm of the machine learning to advance learning as described in <1. Machine learning>.

A description is provided below based on a functional block diagram of the wire electric discharge machine 1.

Figure 5:
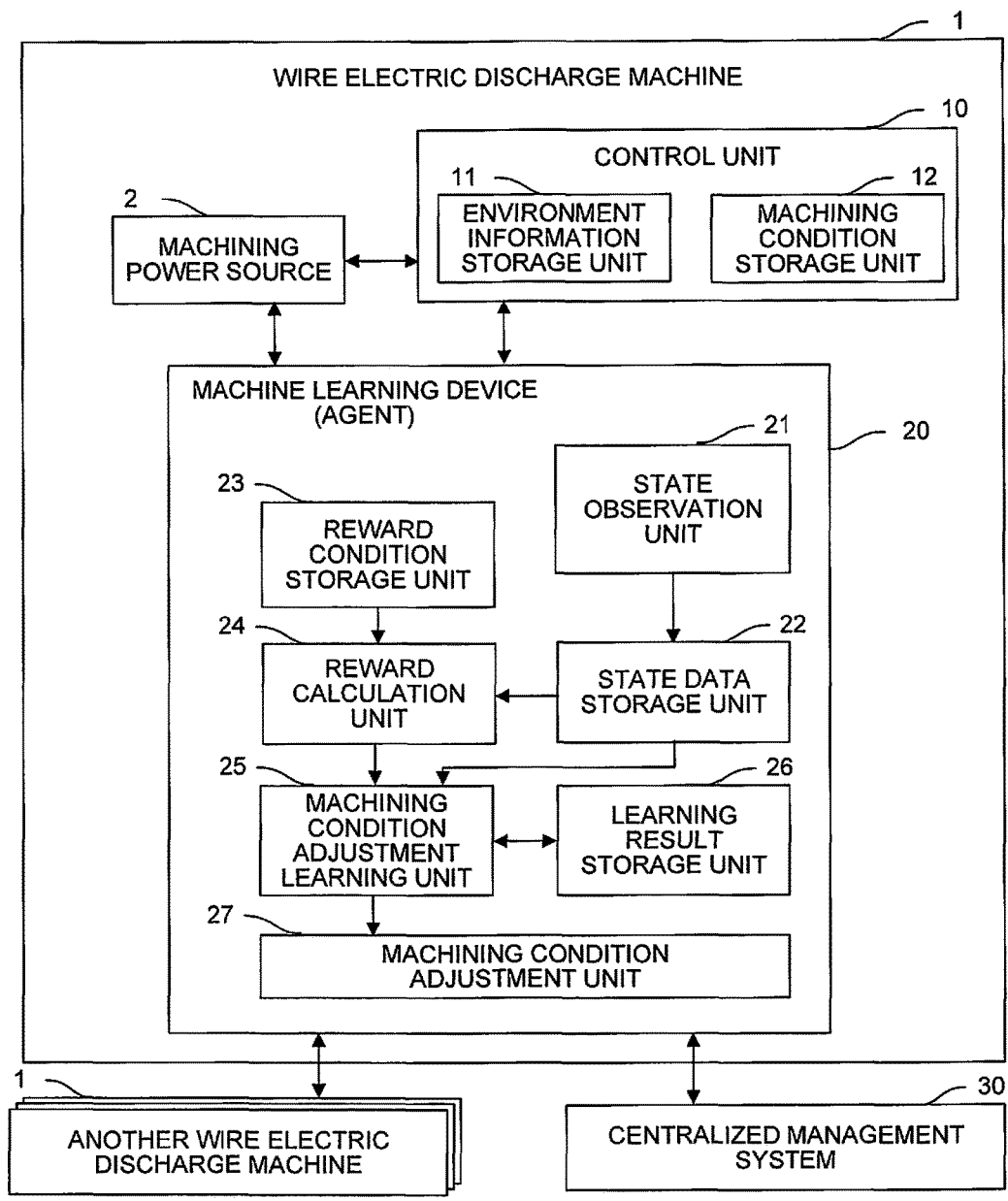
FIG. 5 is a functional block diagram illustrating the wire electric discharge machine according to the embodiment of the present invention.

FIG. 5 is a functional block diagram illustrating the wire electric discharge machine according to the present embodiment. The wire electric discharge machine 1 according to the present embodiment is a machine which includes a plurality of axes, by which upper and lower nozzles supporting a wire and a table on which a workpiece is placed are relatively moved, and machines a workpiece by electric discharge generated by potential difference between the wire, which is supported by the upper and lower nozzles, and a workpiece. Here, these configurations are common configurations of a wire electric discharge machine and are not especially needed for description of an operation in the machine learning in the present invention, so that detailed description of these configurations is omitted in this specification. The wire electric discharge machine 1 includes the machining power source 2 which controls a voltage applied between a wire and a workpiece, the control unit 10 which controls the whole, including each axis and the machining power source 2, of the wire electric discharge machine 1 based on a program and the like and acquires data of a machining state, for example, from each unit of the wire electric discharge machine 1, and the machine learning device 20 which serves as artificial intelligence performing the machine learning. When the configuration illustrated in FIG. 5 is compared to the elements in the reinforcement learning illustrated in FIG. 3, the machine learning device 20 corresponds to the agent and the whole including each axis, the control unit 10, and the like included in the wire electric discharge machine 1 corresponds to the environment.

The control unit 10 analyzes a program read from a memory, which is not shown, and controls axes of the wire electric discharge machine 1 based on control data obtained as an analysis result so as to machine a workpiece. In a general wire electric discharge machine, the control unit 10 controls the machining power source 2 based on set values of environment information such as a wire diameter, a plate thickness of a workpiece, a material, and a nozzle gap which are set by an operator or the like and stored in an environment information storage unit 11 and set values of machining conditions such as a voltage value and applying time of an interpolar voltage, pause time, and a supply amount of a machining fluid which are stored in a machining condition storage unit 12. Whereas, in the present invention, as for machining conditions, the machine learning device 20 performs adjustment of machining conditions based on a result of learning based on the set values of machining conditions stored in the machining condition storage unit 12, and the control unit 10 controls the machining power source 2 based on the adjustment result.

Further, the control unit 10 collects data related to a machining state from each component provided to the wire electric discharge machine 1 and notifies the machine learning device 20 of the collected data together with the environment information stored in the environment information storage unit 11 and set values of machining conditions stored in the machining condition storage unit 12. Examples of the data related to a machining state include position information which is a coordinate value of each axis of the wire electric discharge machine 1, machining information such as an actual voltage value, an actual current value, a machining speed value, the number of times of electric discharge, a fluid pressure of a machining fluid, and an occurrence of short circuit/disconnection which are measured in machining of a workpiece.

The machine learning device 20 performing the machine learning includes a state observation unit 21, a state data storage unit 22, a reward condition storage unit 23, a reward calculation unit 24, a machining condition adjustment learning unit 25, a learning result storage unit 26, and a machining condition adjustment unit 27. The machine learning device 20 may be provided in the wire electric discharge machine 1 or may be provided to a personal computer or the like outside the wire electric discharge machine 1.

The state observation unit 21 is a functional means which observes data related to a machining state in the wire electric discharge machine 1 to acquire the data into the machine learning device 20 via the control unit 10. Examples of the data related to a machining state includes environment information such as a wire diameter, a plate thickness of a workpiece, a material, and a nozzle gap, position information which is a coordinate value of each axis of the wire electric discharge machine, and machining information such as an actual voltage value, an actual current value, a machining speed value, the number of times of electric discharge, a fluid pressure of a machining fluid, and an occurrence of short circuit/disconnection which are measured in machining of a workpiece, which are mentioned above.

The state data storage unit 22 is a functional means which inputs and stores data related to a machining state and outputs the stored data related to a machining state to the reward calculation unit 24 and the machining condition adjustment learning unit 25. Data related to a machining state and to be inputted may be data acquired in the latest machining operation or data acquired in a past machining operation. Further, the state data storage unit 22 can also input to store or output data related to a machining state stored in another wire electric discharge machine 1 and a centralized management system 30.

The reward condition storage unit 23 is a functional means for storing conditions for giving a reward, which is set by an operator or the like, in machine learning. In the present embodiment, reference value data of theoretical voltage value, current value, and machining speed value which are obtained based on machining conditions set in the machining condition storage unit 12 included in the control unit 10 as well as the conditions for giving a set reward are stored in the reward condition storage unit 23. A reward includes a plus reward and a minus reward and can be appropriately set.

Input with respect to the reward condition storage unit 23 may be performed from a personal computer, a tablet terminal, or the like used in the centralized management system 30, for example. However, when input is enabled to be performed via an MDI device which is included in the wire electric discharge machine 1 and is not shown, setting can be more simply performed.

The reward calculation unit 24 analyzes data related to a machining state inputted from the state observation unit 21 or the state data storage unit 22 based on conditions set in the reward condition storage unit 23 and outputs a calculated reward to the machining condition adjustment learning unit 25.

Examples of reward conditions set in the reward condition storage unit 23 according to the present embodiment are described below.
[Reward 1: Approach or Deviation Between Actual Voltage Value and Reference Value Data, Between Actual Current Value and Reference Value Data, and Between Machining Speed Value and Reference Value Data (Plus Reward, Minus Reward)]

When each of an interpolar actual voltage value, an interpolar actual current value, and a machining speed (relative moving speed between a wire and a workpiece) which are measured in machining of a workpiece approaches an actual voltage value, an actual current value, and a machining speed value which are set as reference value data through the previous adjustment of machining conditions (adjustment of machining conditions at time t−1), a plus reward is given depending on the ratio of the approach.

On the other hand, when the values deviate from the actual voltage value, the actual current value, and the machining speed value which are set as reference value data through the previous adjustment of machining conditions, a minus reward is given depending on the ratio of the deviation.

In calculation of a reward, the approach quantity and the deviation quantity of each of an actual voltage value, an actual current value, and a machining speed value may be weighted. Further, the way of weighting may be changed depending on difference between reference value data and actual value data.
[Reward 2: Occurrence of Short Circuit/Disconnection (Minus Reward)]

When short circuit or disconnection occurs in machining of a workpiece by the wire electric discharge machine 1, a minus reward is given.

The machining condition adjustment learning unit 25 performs machine learning (reinforcement learning) based on data related to a machining state and including input data and the like, a result of adjustment of machining conditions of the wire electric discharge machine 1 which is performed by the unit 25, and a reward calculated in the reward calculation unit 24.

Here, in the machine learning performed by the machining condition adjustment learning unit 25, the state $s_t$ is defined by a combination of data related to a machining state at time t, determination of the adjustment amount of machining conditions in accordance with the defined state $s_t$ is set as the action $a_t$, machining conditions acquired by a machining condition adjustment unit 27, which will be described later, from the machining condition storage unit 12 is adjusted so as to output a result of the adjustment. The machining power source 2 of the wire electric discharge machine 1 is controlled based on the adjusted machining conditions so as to machine a workpiece, and a value calculated by the reward calculation unit 24 based on data which is obtained as a result of the machining is set as the reward $r_{t+1}$. A value function used in learning is determined in accordance with an applied learning algorithm. In the case where Q learning is used, for example, learning may be advanced by updating an action value function $Q(s_t, a_t)$ in accordance with Formula 2 mentioned above.

Figure 6:
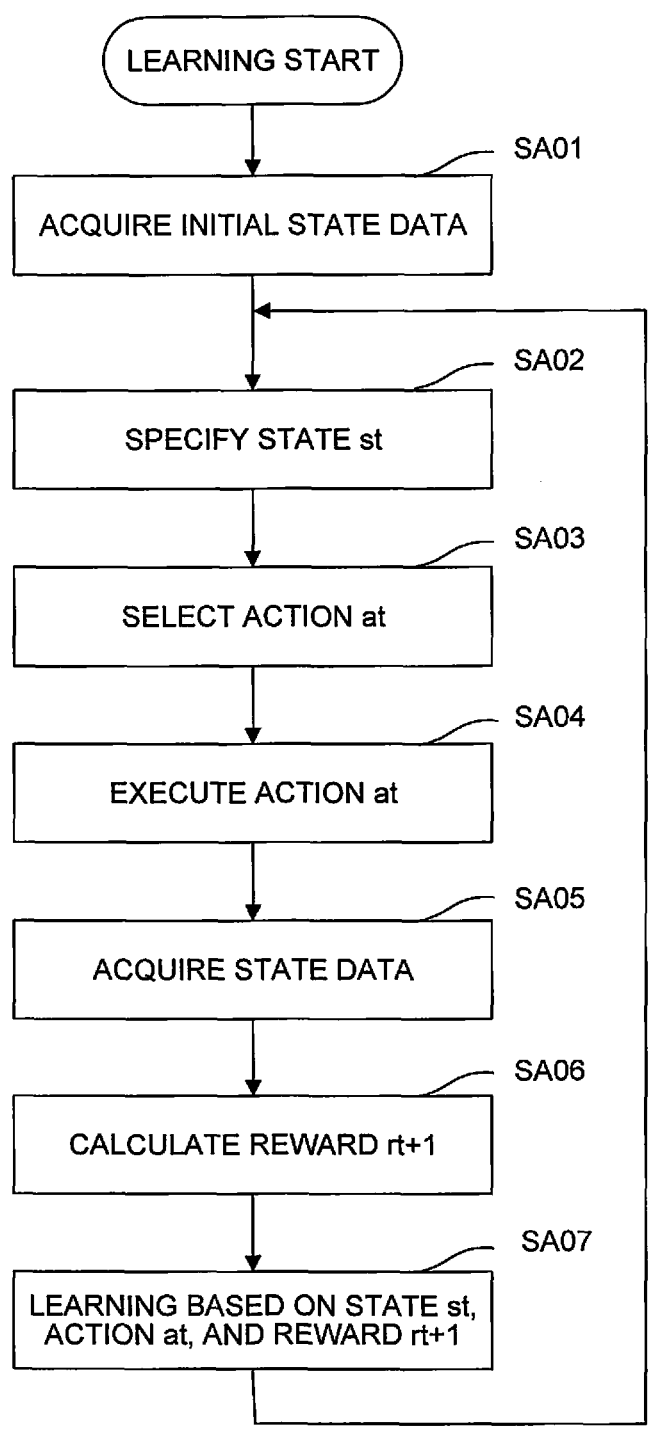
FIG. 6 is a flowchart illustrating a flow of the machine learning according to the embodiment of the present invention.

A flow of the machine learning performed by the machining condition adjustment learning unit 25 is described with the flowchart in FIG. 6.

[Step SA01] When the machine learning is started, the state observation unit 21 acquires data related to a machining state of the wire electric discharge machine 1.

[Step SA02] The machining condition adjustment learning unit 25 specifies a current state $s_t$ based on the data related to a machining state and acquired by the state observation unit 21.

[Step SA03] The machining condition adjustment learning unit 25 selects the action $a_t$ (adjustment of machining conditions) based on a past learning result and the state $s_t$ specified in step SA02.

[Step SA04] The action $a_t$ selected in step SA03 is executed.

[Step SA05] The state observation unit 21 acquires data related to a machining state and representing a state of the wire electric discharge machine 1. On this stage, the state of the wire electric discharge machine 1 has changed due to the action $a_t$ executed in step SA04 along with time shift from time t to time t+1.

[Step SA06] The reward calculation unit 24 calculates the reward $r_{t+1}$ based on the data, which is acquired in step SA05, of an evaluation result.

[Step SA07] The machining condition adjustment learning unit 25 advances the machine learning based on the state $s_t$ specified in step SA02, the action $a_t$ selected in step SA03, and the reward $r_{t+1}$ calculated in step SA06 and the processing returns to step SA02.

Referring back to FIG. 5, the learning result storage unit 26 stores a result of learning of the machining condition adjustment learning unit 25. Further, when the machining condition adjustment learning unit 25 reuses the learning result, the learning result storage unit 26 outputs the stored learning result to the machining condition adjustment learning unit 25. In storage of a learning result, a value function corresponding to a machine learning algorithm which is used may be stored by using an approximation function or an array or by a supervised learning device such as a multi-value output SVM and a neural network, for example, as described above.

Here, the learning result storage unit 26 can be allowed to input and store a learning result which is stored in another wire electric discharge machine 1 or the centralized management system 30 or allowed to output a learning result stored therein to another wire electric discharge machine 1 or the centralized management system 30.

The machining condition adjustment unit 27 determines an adjustment amount of machining conditions based on a result of learning of the machining condition adjustment learning unit 25 and data related to a current machining state. The determination of the adjustment amount of machining conditions herein corresponds to the action a used in the machine learning. In adjustment of machining conditions, combinations of change amounts of parameters constituting the machining conditions may be prepared as selectable actions (action 1: a voltage value=−5%, action 2: applying time=+1%, . . . ) so as to select an action, by which the maximum reward will be obtained in the future, based on past learning results or an action in which a plurality of items of machining conditions are simultaneously adjusted may be prepared, for example. Further, the above-mentioned ε greedy algorithm may be employed and a random action may be selected with a fixed probability so as to progress the learning of the machining condition adjustment learning unit 25.

Subsequently, the machining condition adjustment unit 27 adjusts machining conditions acquired from the machining condition storage unit 12 based on the determined adjustment amount of machining conditions so as to set the machining conditions which are the adjustment result with respect to the machining power source 2. Then, the machining power source 2 is controlled by the control unit 10 based on the machining conditions adjusted by the machining condition adjustment unit 27.

Subsequently, the machine learning device 20 performs acquisition of a current state of the wire electric discharge machine 1 again and repeats learning by using inputted data related to a machining state. Accordingly, a superior learning result can be obtained.

When adjustment of machining conditions corresponding to a machining state is effected in machining of a workpiece by the wire electric discharge machine 1 as a result of learning thus performed by the machine learning device 20, the learning by the machine learning device 20 is completed.

When machining is actually performed by the wire electric discharge machine 1 by using learning data obtained through the completion of the learning, an operation may be repeated in a manner to use the learning data of the time obtained through the completion of the learning as it is without execution of new learning by the machine learning device 20.

Further, the machine learning device 20 which has completed learning (or the machine learning device 20 in which learning data within the learning result storage unit 26 were copied from another machine learning device 20 completed the learning) may be attached to another wire electric discharge machine 1 so as to repeatedly perform an operation while using the learning data of the time of the learning completion as it is.

Further, the machine learning device 20 which has completed learning may be attached to another wire electric discharge machine 1 with remaining its learning function effective and machining of a workpiece may be continued. Accordingly, the machine learning device 20 can be allowed to further learn individual difference, secular change, and the like different in every wire electric discharge machine. Thus, an operation can be performed while searching better adjustment of machining conditions for the corresponding wire electric discharge machine.

The machine learning device 20 of the wire electric discharge machine 1 may perform machine learning independently. However, when a plurality of wire electric discharge machines 1 including means for communicating with the outside respectively are provided, data related to a machining state and stored in respective state data storage units 22 and learning results stored in respective learning result storage units 26 can be mutually transmitted and received to be shared and accordingly, machine learning can be performed more efficiently.

For example, when learning is performed while varying machining conditions within a predetermined range, data related to machining states and learning data are mutually exchanged among a plurality of wire electric discharge machines 1 while performing machining in a manner to respectively vary the adjustment amounts, which are different among the wire electric discharge machines 1, within a predetermined range, so as to advance learning in parallel. Thus, learning can be performed efficiently.

Thus, when data are exchanged among a plurality of wire electric discharge machines 1, communication may be performed via a host computer such as the centralized management system 30, the wire electric discharge machines 1 may directly communicate with each other, or communication may be performed by using a cloud. However, there is the case where it is preferable to use a communication means of high communication speed, in case large quantity of data is to be dealt.

The embodiment of the present invention is described above. However, the present invention is not limited to the example of the above-described embodiment and can be embodied in various aspects by adding alteration as appropriate.

The invention claimed is:

1. A wire electric discharge machine which controls a machining power source and a machining fluid in accordance with a machining condition set by a machining condition setting unit, applies a voltage between a wire electrode stretched between upper and lower nozzles and a workpiece so as to generate electric discharge, and relatively moves the wire electrode and the workpiece so as to machine the workpiece, the wire electric discharge machine comprising:

an environment information storage unit which stores environment information representing an environment related to the machining; and
a machining condition adjustment device which performs machine learning of an adjustment object parameter of the machining condition and an adjustment amount of the adjustment object parameter, wherein the machining condition adjustment device includes
a state observation unit which acquires state data, the state data being information representing a machining state in the machining,
a reward condition storage unit which stores a reward condition,
a reward calculation unit which calculates a reward based on the state data and the reward condition,
a machining condition adjustment learning unit which performs machine learning the machining condition adjustment, and
a machining condition adjustment unit which determines an object parameter of the machining condition adjustment and an adjustment amount thereof as an adjustment action based on a machine learning result of the machining condition adjustment obtained by the machining condition adjustment learning unit, the state data, and the environment information and adjusts a machining condition set by the machining condition setting unit based on the adjustment action so as to output an adjusted machining condition,
the wire electric discharge machine controls the machining power source in accordance with the outputted adjusted machining condition to perform a machining action, and
the machining condition adjustment learning unit performs machine learning for the machining condition adjustment based on
the adjustment action,
the state data acquired by the state observation unit after the machining action in accordance with the outputted adjusted machining condition, and
the reward calculated by the reward calculation unit.

2. The wire electric discharge machine according to claim 1, wherein the state data includes at least position information of the wire electrode with respect to the workpiece.

3. The wire electric discharge machine according to claim 1, wherein the state data includes at least one of a machining voltage, a machining current, a machining speed, a number of times of electric discharge, an amount of a machining fluid, machining fluid pressure, an occurrence of short circuit, and an occurrence of disconnection.

4. The wire electric discharge machine according to claim 1, wherein the reward condition storage unit stores reference value data of a machining voltage, a machining current, and a machining speed of a case where machining is performed under a machining condition set by the machining condition setting unit.

5. The wire electric discharge machine according to claim 1, wherein
the state data includes at least a machining voltage, a machining current, and a machining speed, and
the reward calculation unit gives a plus reward in a case where a machining voltage, a machining current, and a machining speed which are included in the state data approach reference value data obtained based on a machining condition set by the machining condition setting unit.

6. The wire electric discharge machine according to claim 1, wherein
the state data includes at least a machining voltage, a machining current, a machining speed, an occurrence of short circuit, and an occurrence of disconnection, and
the reward calculation unit gives a minus reward in a case where a machining voltage, a machining current, and a machining speed which are included in the state data deviate from reference value data obtained based on a machining condition set by the machining condition setting unit or in a case where at least one event between short circuit and disconnection which are included in the state data occurs.

7. The wire electric discharge machine according to claim 1, wherein
the wire electric discharge machine is connected with at least one another wire electric discharge machine and mutually exchanges or shares a result of machine learning with another wire electric discharge machine.

8. A machining condition adjustment device for a wire electric discharge machine which controls a machining power source and a machining fluid in accordance with a machining condition set by a machining condition setting unit, applies a voltage between a wire electrode stretched between upper and lower nozzles and a workpiece so as to generate electric discharge, and relatively moves the wire electrode and the workpiece so as to machine the workpiece, the machining condition adjustment device configured to perform machine learning for machining condition adjustment of the machining condition and comprising:
a learning result storage unit which stores in a nonvolatile memory the results of learning for the machining condition adjustment that are expressed as a function;
a state observation unit which acquires state data, the state data being information representing a machining state in the machining; and
a machining condition adjustment unit which determines an object parameter of the machining condition adjustment and an adjustment amount of the object parameter or a value after adjustment of the object parameter based on the results of learning stored in the learning result storage unit and the state data observed by the state observation unit so as to adjust the machining condition and output an adjusted machining condition, wherein
the wire electric discharge machine controls the machining power source in accordance with the outputted adjusted machining condition to perform a machining action.

* * * * *